Figure 5:
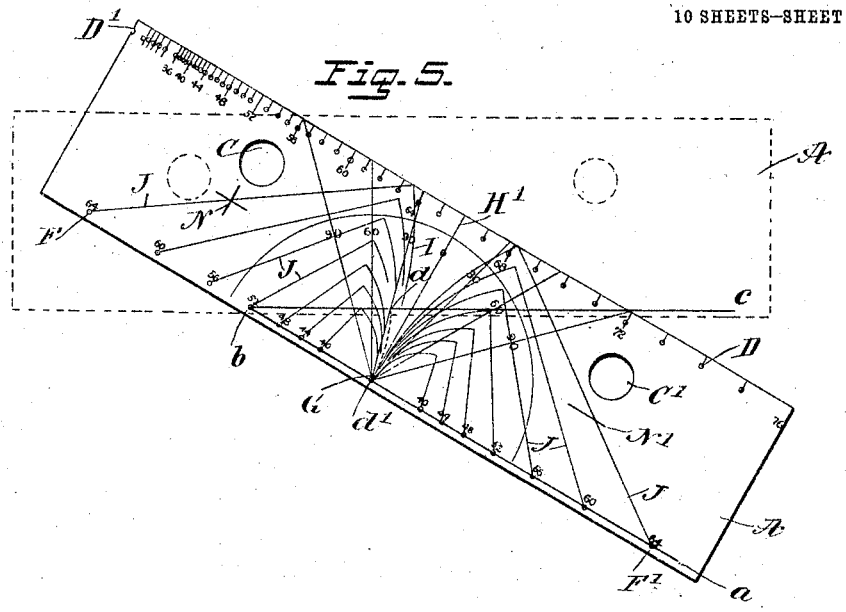

J. W. WHALEN.
DRAWING INSTRUMENT.
APPLICATION FILED DEC. 18, 1902.
1,043,789.
Patented Nov. 5, 1912.
10 SHEETS—SHEET 1.
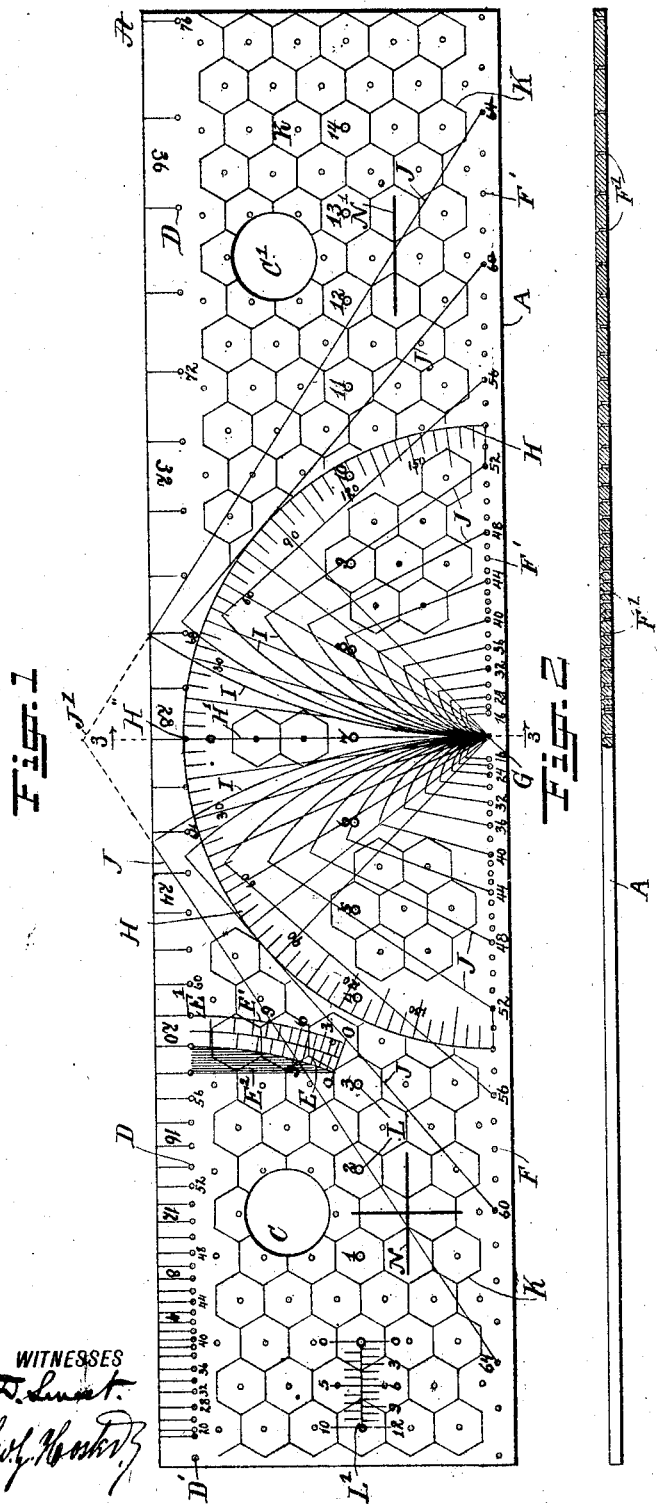
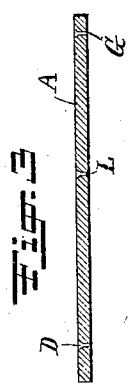
INVENTOR
John W. Whalen
BY
ATTORNEYS
WITNESSES

J. W. WHALEN.
DRAWING INSTRUMENT.
APPLICATION FILED DEC. 18, 1902.

1,043,789.

Patented Nov. 5, 1912
10 SHEETS—SHEET 2.

WITNESSES:

INVENTOR
John W. Whalen
BY
ATTORNEYS.

J. W. WHALEN.
DRAWING INSTRUMENT.
APPLICATION FILED DEC. 18, 1902.
1,043,789.
Patented Nov. 5, 1912.
10 SHEETS—SHEET 3.
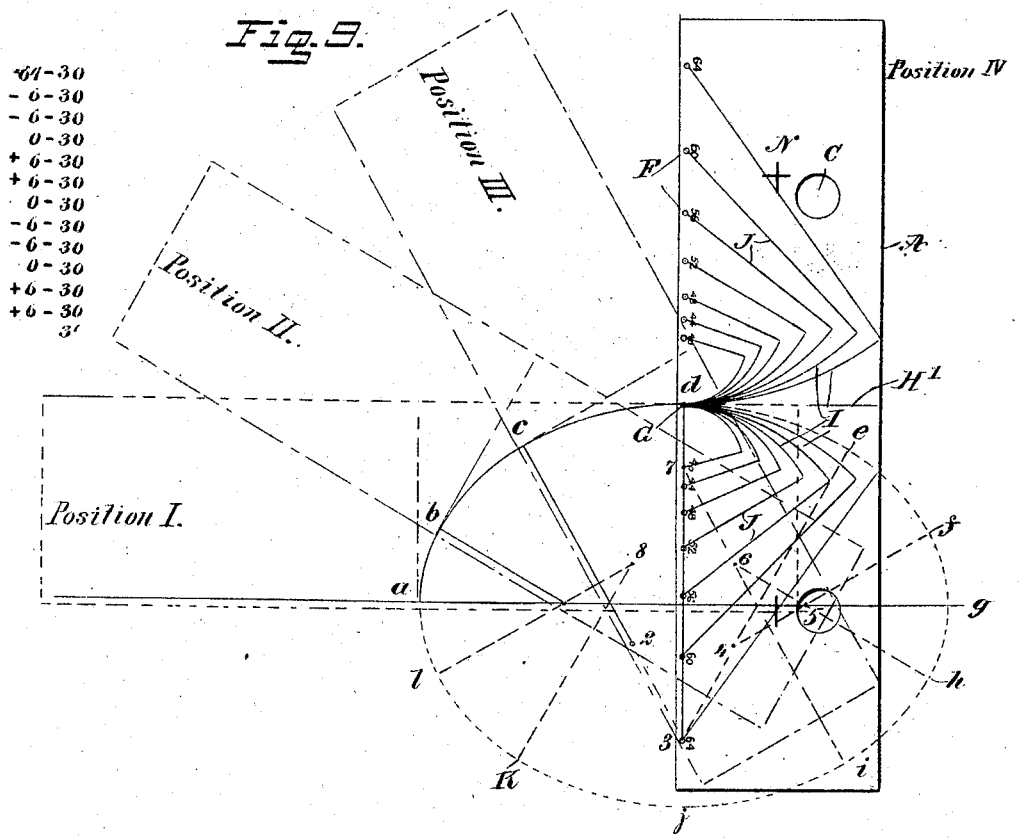
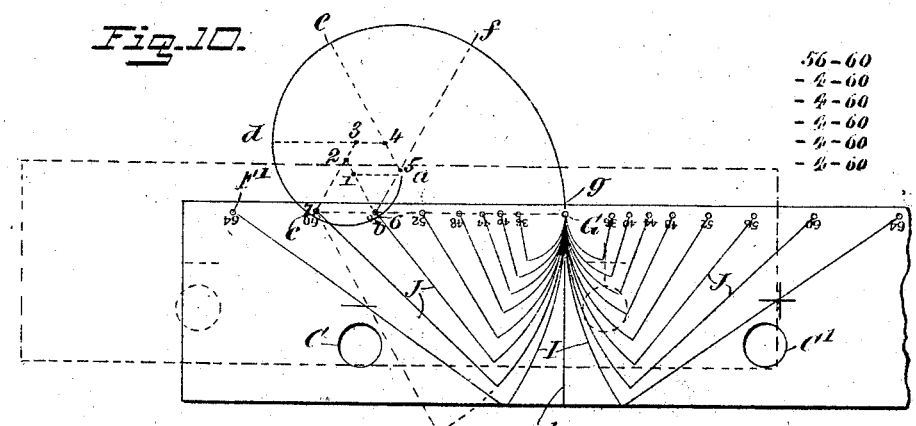
WITNESSES:
INVENTOR
John W. Whalen
BY
ATTORNEYS.

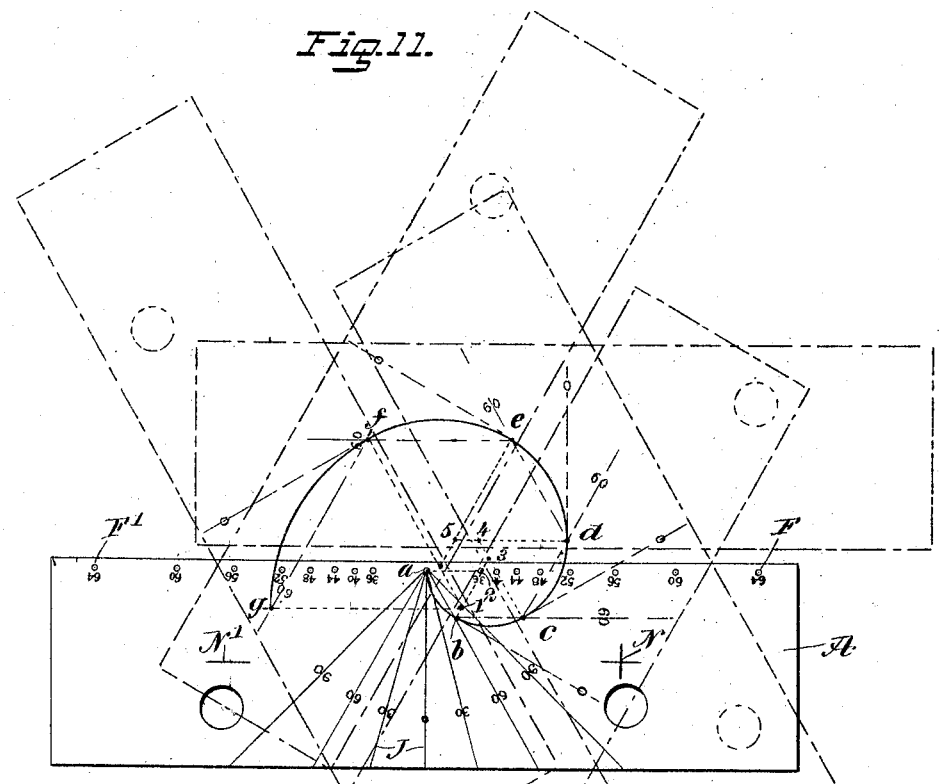

J. W. WHALEN.
DRAWING INSTRUMENT.
APPLICATION FILED DEC. 18, 1902.
1,043,789.
Patented Nov. 5, 1912.
10 SHEETS—SHEET 5.
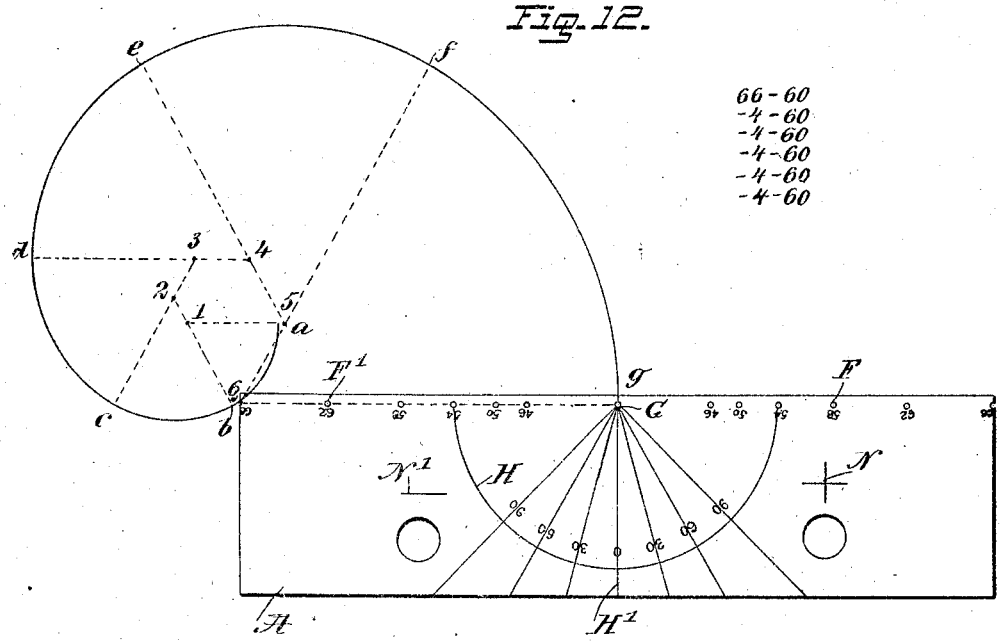
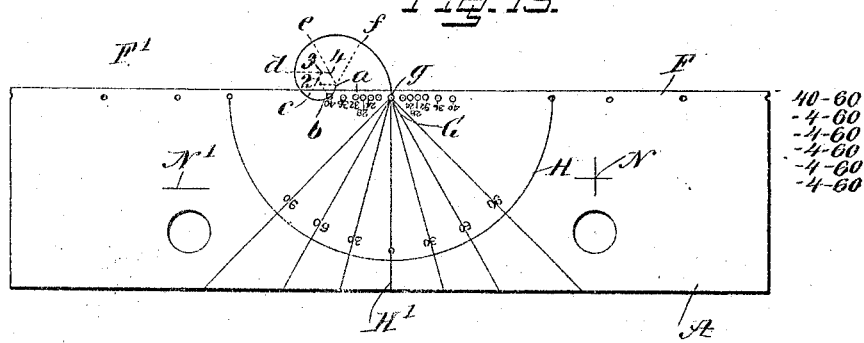
WITNESSES:
INVENTOR
John W. Whalen
BY
ATTORNEYS.

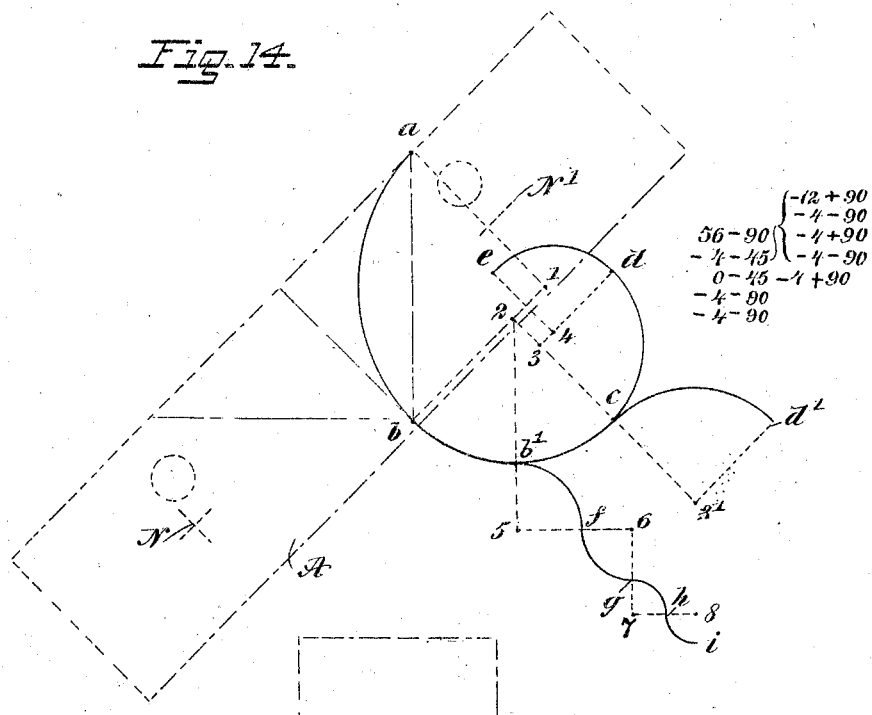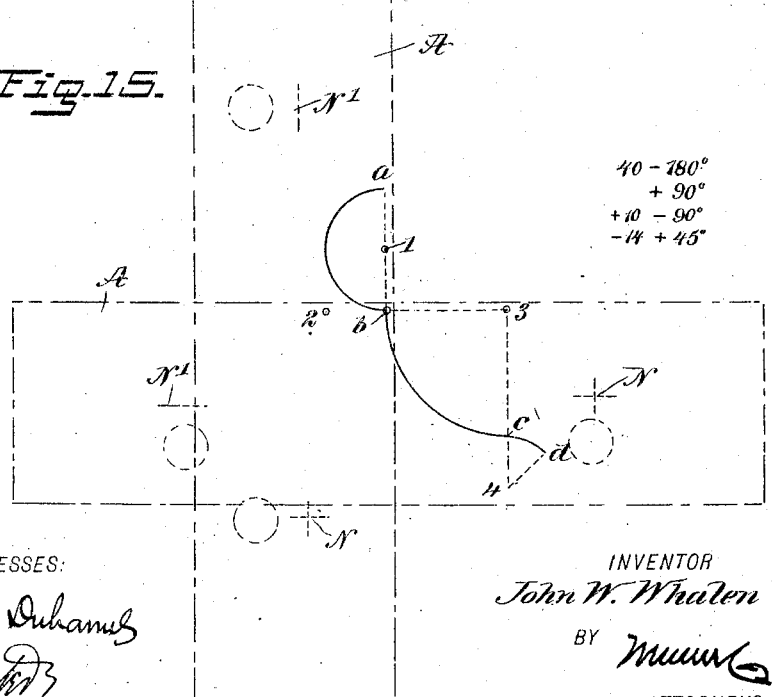

J. W. WHALEN.
DRAWING INSTRUMENT.
APPLICATION FILED DEC. 18, 1902.
1,043,789.
Patented Nov. 5, 1912.
10 SHEETS—SHEET 7.
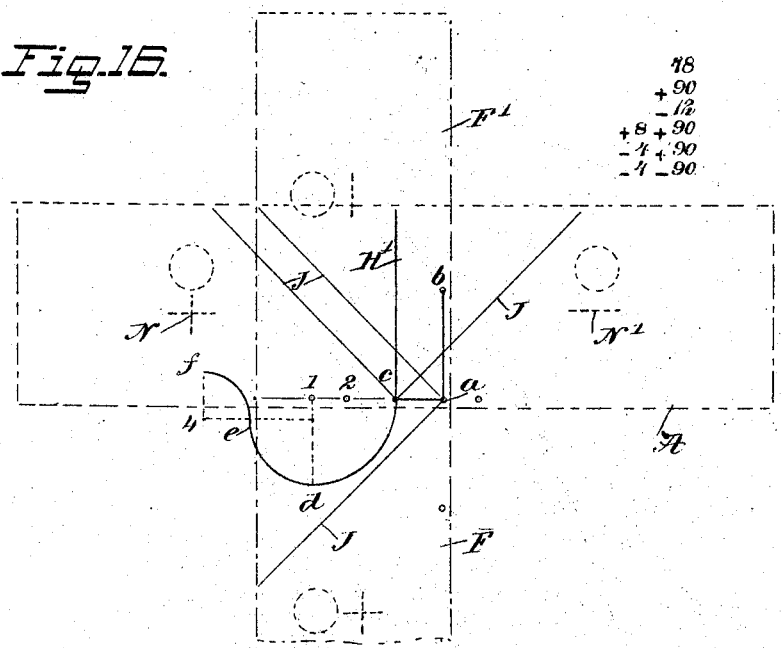
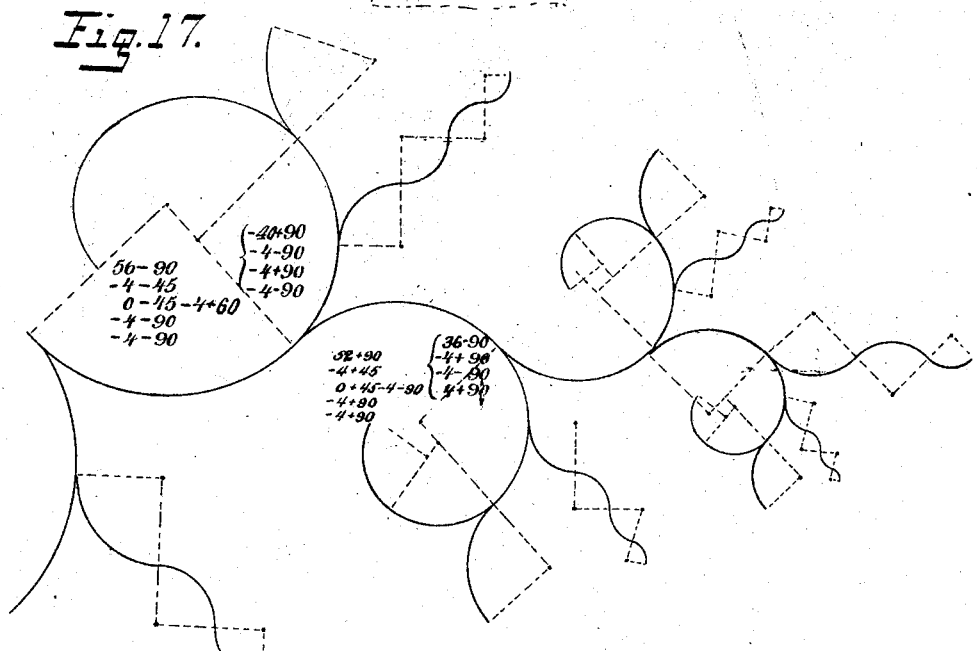
WITNESSES:
INVENTOR
John W. Whalen
BY
ATTORNEYS.

J. W. WHALEN.
DRAWING INSTRUMENT.
APPLICATION FILED DEC. 18, 1902.
1,043,789.
Patented Nov. 5, 1912.
10 SHEETS—SHEET 8.
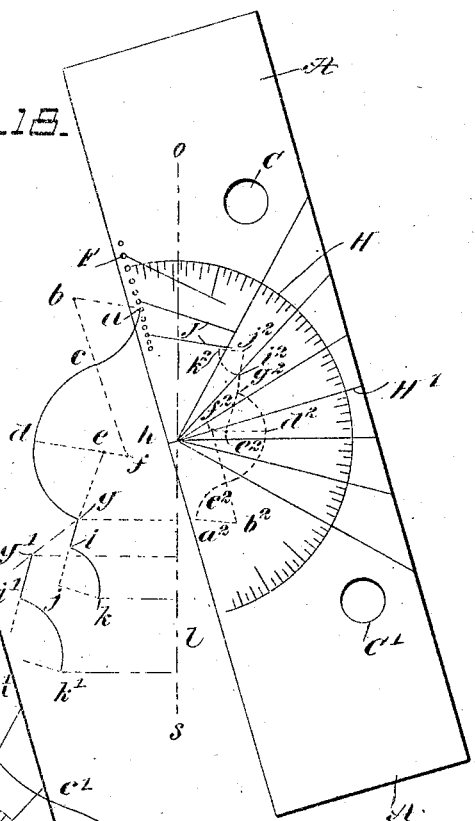
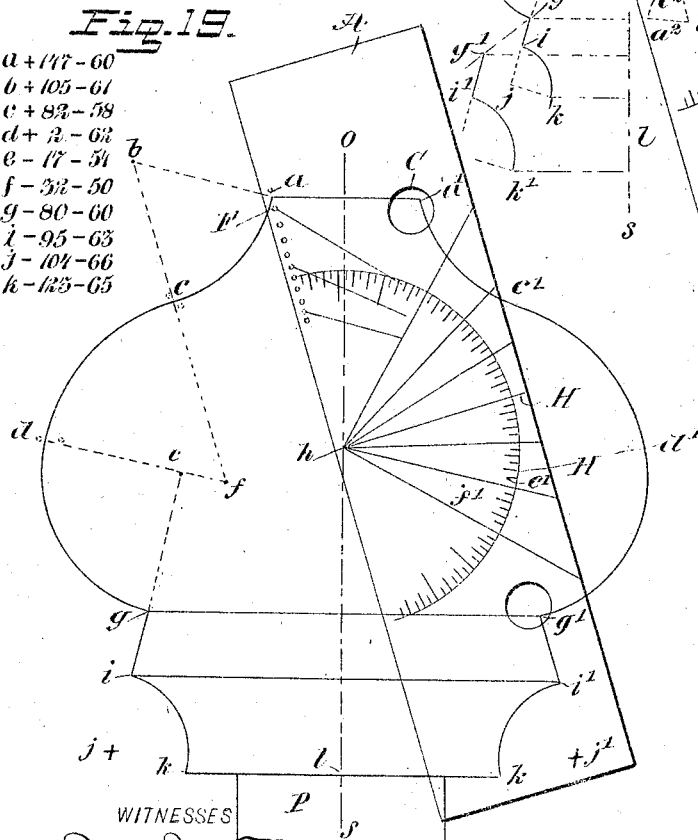

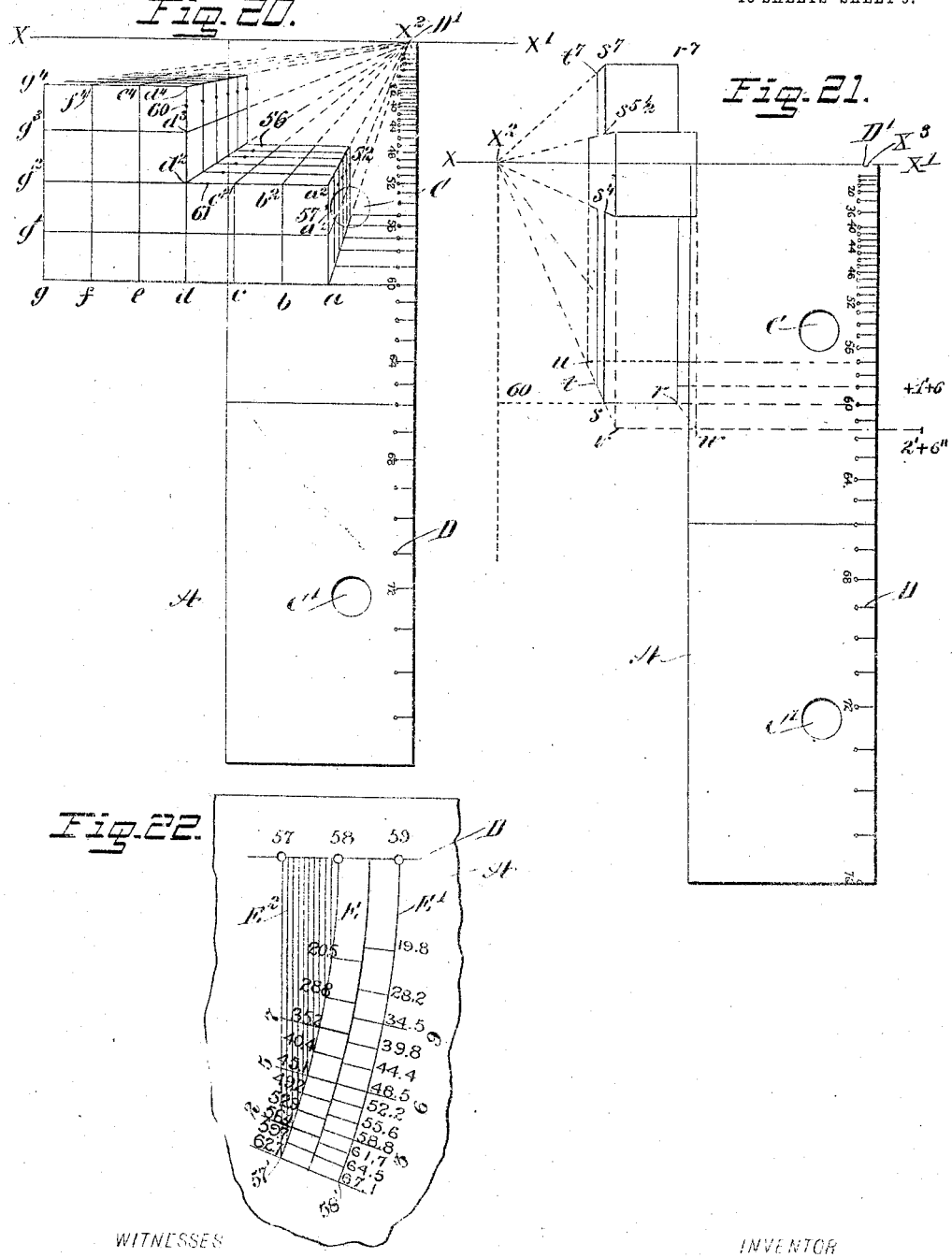

UNITED STATES PATENT OFFICE.

JOHN WILLIAM WHALEN, OF GRAYMONT, ILLINOIS.

DRAWING INSTRUMENT.

1,043,789.  Specification of Letters Patent.  Patented Nov. 5, 1912.

Application filed December 18, 1902. Serial No. 135,731.

*To all whom it may concern:*

Be it known that I, JOHN W. WHALEN, a citizen of the United States, and a resident of Graymont, in the county of Livingston and State of Illinois, have invented a new and Improved Drawing Instrument, of which the following is a full, clear, and exact description.

The object of the invention is to provide a new and improved drawing instrument, which is simple and durable in construction, easily manipulated, and arranged to permit of, first, measuring in degrees an arc of any circle whose dimensions are unknown and whose center is not located; second, insuring accuracy in the measurement of angles and arcs; third, measuring line segments and radii and expressing their length in a certain exponent; fourth, finding the limits of each successive arc and the center of its respective circle in any curve, by means of which any curve may be inked with a compass; fifth, analyzing any curve into measured arcs and radii for making a complete record; sixth, using such record for reproducing the segments of curves or symmetrical curves of the same on an enlarged or reduced scale; seventh, building complex and compound curves and figures composed of straight lines and curves; eighth, forming designs composed of similar curves of varying sizes; ninth, reproducing a curve in a flattened, distorted or elongated manner; tenth, expressing the exponents of the algebraic expression $(ab^n)$ in which $b$ has the value of $$\frac{10}{\sqrt{2}};$$

eleventh, measuring distances from or toward a vanishing point in perspective drawings by the use of a certain scale; twelfth, dividing any units of the said scale into fractions by the employment of a supplementary scale; and thirteenth, laying out or measuring distances in units or fractions of units.

The invention consists of novel features and parts and combinations of the same, as will be more fully described hereinafter, and then pointed out in the claims.

A practical embodiment of the invention is represented in the accompanying drawings forming a part of this specification, in which similar characters of reference indicate corresponding parts in all the views.

Figures 23, 24:
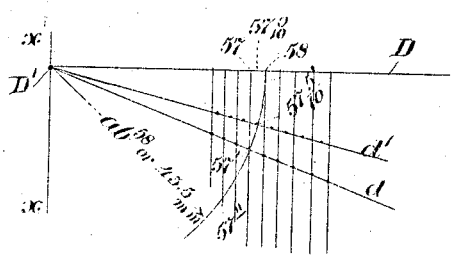

Figure 1 is an enlarged face view of the drawing instrument; Fig. 2 is a front edge view of the same, part being in section; Fig. 3 is a transverse section of the same on the line 3—3 of Fig. 1; Fig. 4 is a side elevation of the needle point used in connection with the instrument shown in Fig. 1; Figs. 5 to 21, inclusive, illustrate various examples of the use of the instrument; Fig. 22 is an enlarged plan view of part of the improvement, showing the scale for fractions of a unit; and Figs. 23 and 24 illustrate examples of the use of the scale for fractions of a unit.

The drawing instrument shown in Fig. 1 is preferably in the form of a rectangular plate A made of celluloid, or other suitable transparent or translucent material, and one of the faces of the said plate, preferably the lower face, is provided with various working scales, numerals, etc., visible from the top, and the plate A is also provided with sets of conical or countersunk apertures adapted to be engaged by a needle point B to allow marking centers, distances, etc., and to permit of swinging the plate A around with the needle point acting as a pivot, the plate being also provided with finger holes C, C', to permit conveniently manipulating the plate for the purpose hereinafter more fully described.

Near the upper edge of plate A is arranged an apertured scale D, which reads from left to right from the starting point D' near the left-hand edge of plate A. The divisions of scale D equal in millimeters the algebraic expression $ab^n$, in which algebraic expression $a$ has the value of .78125 of a millimeter or $\frac{1}{128}$ of 100 millimeters; $b$ has the value of $$\frac{10}{\sqrt{2}};$$

and "$n$" is a variable having the numerical values of 1, 2, 3, 4, . . . of which numerals the numeral 4 and the multiples of 4 are marked on the scale. The larger divisions are equal to the distances from their respective scale points to D' and are designated by numerals written right side up near their respective scale points. The smaller divisions, owing to the conflicting of apertures, cannot be given in regular order on the scale. The smaller divisions equal the distances between two successive apertures and are designated by numerals written upside down, near the center of their respective divisions.

The term "divisions," when used in connection with this scale in the specifications and claims, refers to the distance from respective scale points to D' when the scale is used right side up, and the same term "divisions" refers to distances between successive apertures when the scale is used upside down. Now as $b$ equals the tenth root of two $$(\sqrt[10]{2})$$

by the process of doubling and bisecting any number of graduation points may be found when ten successive points are given; for example, if it be desired to find 64 (which is in reality $ab^{64}$) when 74 (or $ab^{74}$) is given, then $$\frac{ab^{74}}{b^{10}} = ab^{64},$$

and as $$b^{10} = (\sqrt[10]{2})^{10} = 2,$$

it follows that $$ab^{64} = \frac{ab^{74}}{2}.$$

and may be found by dividing $ab^{74}$ by two (2), or by bisecting the distance D'—74 of scale D geometrically, 54 may be found by dividing $ab^{74}$ by four (4) and 44 by dividing $ab^{74}$ by eight (8). In like manner it may be proven that 84 can be found by multiplying $ab^{74}$ by two (2), and so on for any distance greater or smaller.

The ten divisions are as follows:
$ab^{70}$=100.000 millimeters.
$ab^{71}$=107.178 "
$ab^{72}$=114.869 "
$ab^{73}$=123.114 "
$ab^{74}$=131.950 "
$ab^{75}$=141.421 "
$ab^{76}$=151.571 "
$ab^{77}$=162.450 "
$ab^{78}$=174.110 "
$ab^{79}$=186.606 "

In the scale D each division is the mean proportional between its preceding and succeeding divisions, for example:

$$ab^{73} : ab^{74} :: ab^{74} : ab^{75}$$

$$\frac{ab^{73}}{ab^{74}} = \frac{ab^{74}}{ab^{75}}$$

By reducing the fractions $$\frac{1}{b} = \frac{1}{b}$$

In scale D the space between two successive graduation points is the mean proportional between the two adjoining spaces. For example:

$$ab^{74} - ab^{73} : ab^{75} - ab^{74} :: ab^{75} - ab^{74} : ab^{76} - ab^{75}$$

$$\frac{ab^{74} - ab^{73}}{b(ab^{74} - ab^{73})} = \frac{ab^{75} - ab^{74}}{b(ab^{75} - ab^{74})}$$

By reducing $$\frac{1}{b} = \frac{1}{b}$$

In scale D, $ab^{75} - ab^{74} = ab^{36}$ and $ab^{74} - ab^{73} = ab^{35}$ and $ab^{73} - ab^{72} = ab^{34}$ . . .

Now this does not hold true for any value of $b$ except that used in the scale, namely, the tenth root of two $$(\sqrt[10]{2})$$

but that it does hold true when $b$ is the value of the tenth root of two $$(\sqrt[10]{2})$$

is proven below: required to prove that when $$b = \sqrt[10]{2},$$

then $ab^{75} - ab^{74} = ab^{36}$.
Now—

$$ab^{75} = 141.421$$
$$ab^{74} = 131.950$$
$$ab^{75} - ab^{74} = 9.471$$

Now, $ab^{76} = ab^{36} \times b^{40} = ab^{36}(\sqrt[10]{2})^{40} = ab^{36} \times 2^4 = ab^{36} \times 16$ Now—

$$\frac{ab^{76}}{16} = ab^{36}$$

and—

$$\frac{151.571}{16} = ab^{36}$$

and—

$$9.473 = ab^{36}$$

then $ab^{75} - ab^{74}$ (practically) $= ab^{36}$.

Similarly it may be proved that $ab^{74} - ab^{73} = ab^{35}$ and so on.

The quality of the scale is of great value in laying out distances represented by figures which are less than forty and which distances cannot be given in the regular order of the scales. Now as all graduations of the scale D are marked by apertures, they cannot be placed closer to each other than 1 mm. without danger of confliction, for example, to indicate 17 or the distance D'—17 on scale D in regular order would place an aperture between apertures sixteen and twenty of the scale, which aperture would conflict with or break into aperture 16. The distances which cannot be given in the regular order on the scale are found to equal the distances between consecutive points that are given on the scale, and the intervals between such consecutive points are indicated by the numerals written upside down, and which may be easily read and used by turning the scale around. In this manner every distance represented by the numerals from one to thirty-seven (1 to 37), inclusive, may be found. To illustrate this quality of the scale, suppose it be desired to find the distance represented by seventeen (17), which is not given in the regular position on the scale, but by turning the scale around seventeen (17) will be found to equal the distance between the points fifty-five (55) and fifty-six (56).

There is no apparent reason why the difference between any two successive divisions of the scale D should equal some minor division of the same scale; but since it has been found that $ab^{75} - ab^{74} = ab^{36}$ it is evident that all other right side up numerals of the scale D bear the same relation to the inverted numerals placed between them from the algebraic equation $$ab^{75} - ab^{74} = ab^{36}$$
$$\frac{ab^{75}}{b} - \frac{ab^{74}}{b} = \frac{ab^{36}}{b}$$

and—

$$ab^{74} - ab^{73} = ab^{35}$$
$$\frac{ab^{75}}{b^4} - \frac{ab^{74}}{b^4} = \frac{ab^{36}}{b^4}$$

and—

$$ab^{71} - ab^{70} = ab^{32}$$
$$\frac{ab^{75}}{b^8} - \frac{ab^{74}}{b^8} = \frac{ab^{36}}{b^8}$$

and—

$$ab^{67} - ab^{66} = ab^{28}$$

and—

$$ab^{63} - ab^{62} = ab^{24}$$

and—

$$ab^{n} - ab^{n-1} = ab^{n-3b}$$

The value of $a$ in the algebraic expression $ab^n$ is not important, and if $a$ is given any other value the mathematical efficiency of the scale D will be the same. But since some of the measurements, which must be expressed in the term of $ab^n$ are quite small, it is evident that the value of $a$ must be minute. To convey with simplicity the ability of constructing the scale D, it is necessary that ten successive divisions of said scale be given, and to do so with sufficient accuracy requires that those ten divisions be large. To secure the greatest simplicity in the mathematics involved in the computaion of those ten divisions the first one should come out even or free from fractions.

To satisfy the above practical requirements I give $ab^{70}$, or the first of the ten divisions, the value of (100 mm.) one hundred millimeters; and deduce the value of $a$ by the following algebraic expression $$ab^{70} = 100 \text{ mm.}$$

and—

$$b = \sqrt[10]{2}$$

$$(\sqrt[10]{2})^{70} = 100 \text{ mm.}$$

$$a(\sqrt[10]{2}^{10})^7 = 100 \text{ mm.}$$

$$a2^7 = 100 \text{ mm.}$$

$$a128 = 100 \text{ mm.}$$

$$a = \tfrac{100}{128} \text{ mm.}$$

$$a = .78125 \text{ mm.}$$

The plate $a$ is provided with apertures on the scale line of the scale D to permit of inserting the needle point B on any desired scale line for conveniently marking desired distances on paper, by puncturing the same by a needle point through the corresponding apertures to obtain a record. From the points fifty-eight (58) and fifty-nine (59) of the scale D are drawn the concentric arcs E and E', respectively, in a downward direction, as plainly indicated in Figs. 1 and 22. The centers of the arcs E, E' are in the beginning point D' of the scale D and the arc E is divided into ten parts by graduation points, the length of the respective parts of the arc being such that lines drawn from their respective graduation points perpendicular to scale D cut scale D at points which limit distances from D' of scale D, which distances equal, respectively, the algebraic expressions $ab^{57}$, $ab^{57.1}$, $ab^{57.2}$, $ab^{57.3}$ .... for each respective arc graduation, in which algebraic expression $a$ has the value of .78125 mm. and $b$ has the value of $$\sqrt[10]{2}.$$

Arc E' is divided into twelve parts by graduation points, the length of the respective parts of the arc being such that lines drawn from their respective graduation points, perpendicular to scale D cut scale D at points which limit distances from D' of scale D, which distances equal respectively the algebraic expressions $$ab^{58}, ab^{58.1}, ab^{58.2}, ab^{58.3}$$

for each respective arc graduation; in which algebraic expression $a$ has the value of .78125 mm. and $b$ has the value of $$\sqrt[10]{2}.$$

Linear scales F, F', similar to scale D, are laid out along the base of the plate A in opposite directions from the center G. A protractor H is arranged on the plate A with G as the center and graduated in half degrees as the unit beginning with zero at the perpendicular line H′ rising from the center G. The radial lines which are designated by 15, 30, 45, 60, 75 and 90 degrees, are drawn to the center G. From the point sixty-four (64) of the scales F, F′ as centers and the distance from the point sixty-four (64) to the center G as radii are drawn the arcs I, and then the radial lines J are drawn from the points sixty-four (64) to the intersecting points of the arcs I with the upper edge of the plate A. The lines J, if continued, intersect at the point J′ located a distance beyond the upper edge of the plate A, and in the continuation of the zero line H′ of the protractor, as plainly indicated in the dotted lines in Fig. 1. From the point sixty (60) of the scales F, F′ are drawn arcs and radial lines similar to the arcs I and radial lines J extending toward the point J′ from sixty-four (64) and similar arcs and radial lines are drawn from every fourth point of each scale F, F′ down to the points sixteen (16), it being expressly understood that all such radial lines run toward the point J′.

In addition to the scales, etc., already described, the face of the plate A is laid out with polygonal figures K of honeycomb design, and preferably in the form of hexagons, each having one of its sides co-extensive with a side of the adjacent hexagon, as plainly indicated in Fig. 1. The plate A is also provided with a scale L running along at or near the middle of the plate, and this scale L is laid out in equal parts with an aperture at each divisional mark. A divisional part L′ of the scale at the left-hand end thereof is sub-divided in ten and in twelve equal parts.

The left-hand portion of the plate A is considered the positive one and is marked with the plus sign +, and the right-hand portion of the said plate is considered the negative side and is provided with the minus sign —.

The device is used as follows: Were it desired to measure in degrees any angle of a circle whose dimensions are unknown and whose center is not located; for instance, to measure the arc $d'd$ of Fig. 5, when the center $b$ and lines $a\,b$ and $c\,b$ are not given, then the operator places the instrument over the arc $d'd$ so that the center G of the instrument coincides with the point $d'$ and thrusting the needle point B through the aperture at G rotates the instrument about that point until some one of the arcs I is found to coincide with the arc $d'd$ as when the instrument is in the primary position shown in Fig. 5. It will now be noticed that the radial line G 30 on the positive side of the instrument runs to the point $d$, which radial line indicates the degrees of the arc $d'd$ which, in this example, is 30 degrees. Since all the arcs I are drawn tangent to the perpendicular G H′ and when the instrument is in the position above stated, arc $d'd$ coincides with one of the arcs I, and therefore the perpendicular G H′ is tangent to the arc $d'd$ and the radial line G 30 is evidently its chord; and since the angle formed by a chord and tangent equals one-half the angle standing on the subtended arc, therefore angle H′ G 30 equals one-half of the angle $a\,b\,c$, but since the protractor H is laid out with one-half degree as a unit, the radial line G 30 indicates the correct number of degrees for the arc $d'd$. If the 30 degrees arc $d'd$ had been a part of a larger or smaller circle, the operation of measuring it would have been the same as that above described and the radial line G 30 would have indicated its degrees. The point $d$ of the arc $d'd$ would have intersected the radial line G 30 at a point respectively farther from or closer to the center G as the circle was larger or smaller than in the example illustrated.

Figure 6:
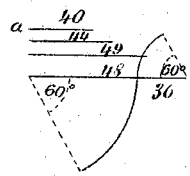
Figure 7:
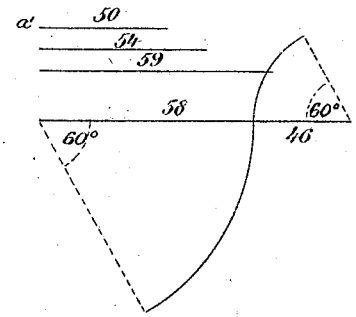
Figure 8:
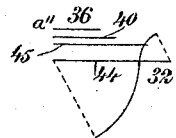

Were it desired to locate the center of the circle of which the arc $d'd$ is a part, the operator observes what one of the lines J intersects with the arc I which coincides with the arc $d'd$ and notes the intersecting point of the line J with the scale near the base of the instrument, and which point of intersection is the center sought, and as the radius of the circle lies in the scale near the base of the instrument it may be measured by scale F. In order to measure distances and express the same in the exponents of $b$ and to increase or decrease the length of line segments or radii to any one of a number of ratios, I proceed as follows, reference being had to Figs. 6, 7, 8 and 24, which latter figure more particularly illustrates fractional measurements hereinafter more fully described. When the set of lines and radii $a$, $b$, $c$, $d$ and $e$, shown in Fig. 6, is given and the lines are measured with either the scale D, F or F′, they will be found to index 40, 44, 49, 48 and 36, respectively. Now if it be desired to increase the length of line marked $a$ to that of $a'$ in Fig. 7, and to increase the lines $b$, $c$, $d$ and $e$ in like proportion, the operator measures the line $a'$ to find that it indexes 50, that is, contains ten points more than the line $a$ of Fig. 6. Now, the lines $b'$, $c'$, $d'$ and $e'$ of Fig. 7 are laid out by increasing each of the corresponding lines of Fig. 6 ten points so that said lines in Fig. 7 index 50, 54, 59, 58 and 46 respectively. If it be desired to reduce the line $a$ to the line $a''$, Fig. 8, and the lines $b$, $c$, $d$ and $e$ of Fig. 6 in the same proportion, then the line $a''$ is first measured with any one of the scales D, F, F′ and as many points (4) as this line is shorter than the line $a$ so many points (4) are taken off from each of the lines $b$, $c$, $d$ and $e$, to produce lines of correct proportionate length, as will be readily understood by reference to Fig. 8.

Now from the foregoing it will be seen that the lines have been increased and decreased in the same ratio by adding and subtracting for the reason that in reality adding on the scales is equivalent to multiplying by $b$ to the power of the number used, and subtracting is equivalent to dividing by the power of $b$.

When it is desired to find the limits of arcs and the centers of their respective circles in a curve or system of points in a curve, I proceed as follows, special reference being had to Fig. 9. When the ellipse and its long axis, shown in Fig. 9, for instance, is given, the plate A is placed in position 1 with the center G at $a$ and its base coinciding with the long axis $a$—$g$. Now it will be noticed that an arc on the negative side of the instrument coincides with a portion of the ellipse and a line connecting this arc with point 52 of scale F'. The needle point B is now passed through the aperture 52, marking center No. 1, and with this needle point as a pivot the plate is turned to position II. or to a position where the center G will start to leave the elliptic line if the plate be pushed farther. Here the point $b$ is marked by the needle point B through the aperture G marking that point. Now it will be noticed that another arc on the same side of the instrument coincides with a portion of the ellipse, and a line connects this arc with point 58 of scale F'. The needle point is now inserted at aperture 58, marking center No. 2, and with that as a center the instrument is turned to position III., or to a point where the center G ceases to follow the elliptic line. Here the needle point is inserted at G to mark the point $c$. Now it will be noticed that another arc coincides with a portion of the ellipse and that a line connects this arc with point 64 of the scale F'. This operation is repeated until the limits $a$, $b$, $c$, $d$, $e$ . . . and the centers of their respective circles 1, 2, 3, 4, 5 . . . are found. With those limits of arcs and centers of circles the ellipse may be inked with a compass. Any curve may in like manner be divided into arcs of circles joined at their points of tangency, and when those limits of arcs and centers of their respective circles are once found the curve may be worked with a compass.

When it is desired to analyze any curve into measured arcs and radii so that a complete record may be taken of the curve, the instrument is used as follows, reference being had to Fig. 10. In order to analyze the spiral curve $a$, $b$, $c$, $d$, $e$, $f$, $g$ the plate A is first placed over the curve with the center G connecting with the point $a$, as indicated in the dotted lines, and then the needle point is inserted in the aperture of the center G and the plate turned until one of the arcs I coincides with the curve $a\ b$. This arc is connected by a line to a point 36 on the negative scale F', and with the point 36 as a center the plate is turned the same as above described relative to Fig. 9, to successively obtain the point 1, 2, 3, 4, 5 and 6. The angle $g\ 6\ f$ or the arc $g\ f$ is now measured according to the rule laid down above in the description relative to Fig. 5, and it will be found to measure 60 degrees and the center of its circle is on the point 56 of the scale F', so that the record for this arc is 56—60, the minus sign belonging to the arc and not to the radius. By measuring the arc $f\ e$ in a like manner it is found to be 60 degrees in length and having a radius of 52, and the record for the two arcs is written $$56—60$$
$$-4—60$$

The next arc $c\ d$ will be found to measure 60 degrees with a radius of 48 or four points less than 52, and so on, and the entire record will appear as shown in the said figure. Now to reproduce the original curve when the record is given it is necessary to first place the plate on the blank drawing paper and then thrust the needle point B through the center G to leave a puncture on the paper. The needle point is now inserted at point 56 on the negative scale F' as per record, and then the plate is turned until the puncture previously made appears beneath the radial line G—60, which is the second numeral on the record. The center G is now again marked on the paper by a puncture and with a point 4 spaces nearer center as a pivoting point for the plate, the latter is again turned as before. This process is repeated until the several points $g$, $f$, $e$, $d$, $c$, $b$, $a$ and the centers 6, 5, 4, 3, 2 and 1 are laid out so that the curve may be readily drawn in ink or pencil by the use of a compass inserted successively at the centers to draw the arcs. To produce similar or symmetrical curves on the same or on a reduced or enlarged scale, it is only necessary to follow the directions last given but with the signs of the arcs reversed so that the curve starts from left to right, see Fig. 11, instead of from right to left as shown in Fig. 10. By changing the left-hand figures of the record of Fig. 10 to 66 and following the directions above given a larger but similar curve, see Fig. 12, can be reproduced. By reducing the left-hand figure of the record in Fig. 10 to, say, 40 and proceeding as before, a smaller but similar curve (see Fig. 13) will be the result. Now it is evident that by changing the records correspondingly to the range of the instrument shown, it is possible to reproduce twenty-five intermediate curves varying in size from the ones last described, but all being similar one to the other; or all the curves may be produced in a symmetrical manner by reversing the signs of the arcs in the record, or reverse curves may be formed by changing the signs of some of the arcs.

To build complex and compound curves and figures composed of straight lines and curves, I proceed as follows, reference being had to Figs. 14, 15, 16 and 17: The curve shown in Fig. 14 is composed of one main spiral curve $a$, $b$, $c$, $d$, $e$ and two branch curves $b'$ $f$ $g$ $h$ $i$ and $c$ $d'$, and may be called a complex curve, and its record is indicated alongside the said figure. This curve is laid out the same as the curve shown in Fig. 12 and above described, with the exception that after the arc $b$ $b'$ has been passed over by the center G, which then lies at $b'$, the needle point is inserted at point 40 (12 less than the arc previously drawn) on the positive scale F of the plate A. The limits of the arcs $f$, $g$, $h$, $i$ and centers 5, 6, 7, 8 are easily found by following the first branch of the record. In this manner any number of branches may be added at points indicated. The record and branches may be provided with additional sub-branches.

In Fig. 15 is shown a compound curve or the combination of two main curves $a$ $b$ and $b$ $c$ $d$ joined by a sharp angle at $b$. In laying out Fig. 15, the needle point B is inserted at the apertured center G, leaving a puncture at $a$, the needle point is then inserted at 40 of the negative scale F', making a puncture at 1, and about that point the instrument is rotated in a negative or anti-clockwise direction until the line G 90 comes in contact with the puncture made at $a$. The needle point is then inserted at G leaving a puncture at $a'$, and the instrument is rotated as before about point 1 until the line G 90 comes in contact with $a'$. With the instrument in this position the needle point is inserted at H'' leaving a puncture at $h''$. The needle point is then inserted at G leaving a puncture at $b$, and about this point the instrument is rotated in a positive or clockwise direction a distance of 90°, that is, the puncture made at $h''$ is made to appear as if it passed beneath 180 degrees of the protractor H graduated with twice the correct number of degrees as previously mentioned. The needle point B is next inserted at 50, or 10 more than the last dimension used on the negative scale F', and with this point as a center the arc $b$ $c$ is laid out.

The figure shown in Fig. 16 consists of the combination of two straight lines $b$ $a$ and $a$ $c$ and the curve $c$ $d$ $e$ $f$. To lay out this combination of lines the center G of plate A is placed at point $b$ and point $a$ is located by passing the needle point B through the aperture 48 of the scale F. The center G of the instrument is then made to coincide with point $a$ and scale F' is made to coincide with the line $b$ $a$; the needle point is then inserted at H'' leaving a puncture at $h''$, and the instrument is made to rotate ninety degrees in a positive or clockwise direction about point $a$, causing the protractor H to pass one hundred and eighty of its half degree units over the puncture made at $h''$, point $c$ is then located by passing the needle point B through aperture 36 (or 12 spaces less than 48) of scale F; the center G is then made to coincide with point $c$ and scale F' made to coincide with the line $a$ $c$. The curve $c$ $d$ $e$ $f$ is then laid out in the manner previously described. In taking a record of or in laying out such a combination of lines the scale F should always be used.

The record of the combination of lines shown in Fig. 16 should appear thus:

$$48 - 0°$$
$$(0+90°)$$
$$-12 - 0°$$
$$- 8 + 90°$$
$$- 4 + 90°$$
$$- 4 - 90°$$

Fig. 17 represents designs built up by the combination of complex curves and in each successive case the positive and negative signs of the arcs are reversed and the left-hand upper figure of the record is reduced by 4. It will be readily seen that a large number of designs may be made by the combination of similar complex curves, by simply modifying or changing the left-hand upper figures and the signs of the arcs in the record. Owing to the fact that compound curves and combinations of lines can be made to undergo the same changes in relation to size it is evident that the number of different designs made by their combination is practically without limit. By the adoption of a few simple rules the curved lines are kept within the bounds of grace and beauty.

In order to elongate, distort or flatten curves in a uniform manner, the following is to be observed: It will be noticed that the ellipse shown in Fig. 9 is simply a flattened circle composed of twelve 30° arcs, the radii of the same varying by steppings of 6 spaces or points on the scale of the instrument. The record of this ellipse is shown in the said figure, and from this record it will be seen that the radius of the original circle is practically 58 points.

The ellipse of Fig. 9 may be developed from a circle in the following manner: Divide a circle having a radius which equals D' 58 of scale D into twelve 30° arcs and the record is obtained—

$$58+30°$$
$$0+30°$$
$$0+30°$$
$$0+30°$$
$$0+30°$$
$$0+30°$$
$$0+30°$$
$$0+30°$$
$$0+30°$$
$$0+30°$$
$$0+30°$$
$$0+30°$$

and to each successive left-hand portion of this record add respectively (−6), (+6), (+6), 0, (−6), (−6), 0, (+6), (+6), 0, (−6), (−6), thus $$\begin{aligned}58+(-6)&=+52 &+52+30°\\0+(+6)&=+\ 6 &+\ 6+30°\\0+(+6)&=+\ 6 &+\ 6+30°\\0+\ \ 0\ &=\ \ 0 &\ \ 0+30°\\0+(-6)&=-\ 6 &-\ 6+30°\\0+(-6)&=-\ 6 &-\ 6+30°\\0+\ \ 0\ &=\ \ 0 &\ \ 0+30°\\0+(+6)&=+\ 6 &+\ 6+30°\\0+(+6)&=+\ 6 &+\ 6+30°\\0+\ \ 0\ &=\ \ 0 &\ \ 0+30°\\0+(-6)&=-\ 6 &-\ 6+30°\\0+(-6)&=-\ 6 &-\ 6+30°\end{aligned} = \begin{aligned}52+30°\\+6+30°\\+6+60°\\\\-6+30°\\-6+60°\\\\+6+30°\\+6+60°\\\\-6+30°\\-6+30°\end{aligned}$$

and the record of the ellipse is obtained.

If 7 or some larger number be substituted for 6 in the above, the ellipse will be made more elliptic and if 5 or some smaller number be substituted for 6 the ellipse will be made less elliptic. In like manner any curve consisting of 30° arcs may be flattened by treating its record as illustrated. This method of flattening curves may be applied equally well to complex and compound curves. A curve may be lengthened by first flattening the same, and then enlarging it. Thus, curves may be distorted as desired by the use of this instrument and without losing the smoothness or character of the curve. In measuring angles slight errors may arise either from inaccuracy in the direction of the instrument, or inaccuracy in handling it. In laying out long continuous curves or spirals, an error may add to another error and thus the figure becomes very inaccurate. In order to prevent these errors use is made of the hexagon figures K, in the following manner: Light lines, preferably in pencil, are drawn over a sheet of paper parallel to the base of the instrument in its first position, with the lines less than the width of the instrument apart, and after the instrument is rotated about any of its points through the arc of 30 degrees, it is evident that the lines joining the centers of the hexagons which lie in rows making an angle of 30 degrees with the base, will come parallel to the lines on the paper. When rotated 30 degrees more, or sixty degrees, the light lines on the paper will be parallel to two sides of every hexagon; and when rotated 30 degrees farther, or ninety degrees, then the lines become parallel to those that connect the centers of the hexagons which lie in rows perpendicular to the base. Thus the accrued error may be corrected every 30 degrees or every multiple of 30 degrees. When arcs of 30 degrees or any multiple of 30 degrees in length, as in Figs. 9, 10, 11, 12, 13, 14, 15, 16 and 17, are to be laid out, then the hexagons may be used as a means of measurement. Confusion may result in that case, however, as no figures would be indicated, but by depending on the protractor H for the indication of degrees, and on the hexagons for accuracy, it is evident that every measurement in degrees becomes practically perfect, for the special case in which the angles employed are multiples of thirty degrees (30°).

The protractor H is finely divided throughout its entire length, so that not only a very efficient protractor is provided, but it permits using the instrument for transferring a system of points to the exact location desired and the system of points may be enlarged or reduced in size and made to appear in the same or symmetrical form. To illustrate this method briefly, I proceed as follows, special reference being had to Figs. 18 and 19. If the systems of points $a\ b\ c\ d$ $e\ f\ g\ i\ \ldots$ of the curve shown in Fig. 18 is given and it be required to transfer and enlarge this given system of points and make it appear in both the same and symmetrical form to produce the cap on the part P, shown in Fig. 19, then the instrument is used tive to the points $a\ b\ c\ \ldots$, and then through in any desired direction at any point relative to the points $a\ b\ c\ \ldots$, and then through the point $k$ is drawn a line perpendicular to the line $s\ o$ to intersect this line at the point $l$ and at some point in the line $s\ o$, preferably at or near the center of the curve in question, is located the point $h$. Now suppose it has been determined to double the size of this system of points, or in terms of this instrument increase each dimension by $b^{10}$. The center line $s\ o$ is laid out as indicated in Fig. 19, and as the distance $h\ l$ in Fig. 18 equals 53¼ according to the scale D, F or F', it is evident that the corresponding distance $h\ l$ on line $s\ o$ in Fig. 19 must equal $$ab^{53\frac{1}{4}} \times b^{10}$$

that is, $h$ is laid out on the new line $o$ 63¼ points, of the scale D, F, F' from the point $l$. The center G of the protractor H is now placed over the point $h$ (Fig. 18) and the needle point B inserted at the center aperture, and then the instrument is rotated until the positive scale F passes over the point $a$.

Now it will be found that the point $a$ lies between the apertures numbered 50 and 51, and the line $s\ o$ coincides with 147 on the positive side of the protractor H and the record for the point $a$ is therefore $+147-50$; the instrument is then rotated about the point $h$ until the positive scale F passes the point $b$, which coincides with the aperture numbered 51 on the scale, while the line $s\ o$ lies under 105 on the same side of the protractor, and the record for the point $b$ is written $+105-51$. This operation is repeated until the entire record is found, the said record being preferably written as indicated in Fig. 18. Now, in order to reproduce this system of points on an enlarged scale as indicated in Fig. 19, each linear distance is increased, say by ten, on the scale D, F or F', and the record is made to read as indicated to the left of Fig. 19. The center G of the protractor is now placed at the point $h$ (Fig. 19) and then the instrument is rotated about that point until 147 on the positive side of the protractor coincides with the line $s\ o$. The needle point B is then passed through the apertures numbered 60 and 61 so as to leave punctures on both sides of the position of the point $a$. For rapid work, where absolute accuracy is not required, the situation of the point $a$ between the punctures just made may be estimated with the eye by comparing the relative location of the point $a$ (Fig. 18) and the two punctures associated with it. In a like manner all of the points $a\ b\ c\ d\ e\ f\ g\ h\ i\ j\ k$ are located. To produce this system of points in symmetrical form, or to locate points $a'\ b'\ c'\ \ldots$ shown in Fig. 19, the positive and negative signs of the angular record are first reversed so that the angular record reads as indicated to the right of Fig. 19. The operator now proceeds the same as when laying out point $a\ b\ c\ \ldots$ only using the negative side of the protractor scale instead of the positive. The system of points may be transferred, by this method, without marking a record or noting the degrees. To illustrate this the small curve $a^2\ b^2\ c^2\ \ldots$, shown in Fig. 18, is given. The center G of the protractor is placed at the point $h$, and then the instrument is rotated about this point until either the scale F or F' passes over the point $a$, and then the needle point B is passed through the apertures numbered 50 and 51, to form punctures on both sides of the point $a$. Now supposing that a curve is to be reduced by $b^8$, while being transferred it is necessary to pass the needle point B through the perforations numbered 42 and 43 of the scale on the opposite side of the instrument, and the position of the point $a$ between the punctures formed is estimated with the eye. After this each other point is located in a like manner, and the curves when complete will appear similar in shape, or up side down and reduced or enlarged as the case may require. When this process is used to transfer drawings from one sheet to another, then the line $s\ o$ should constitute the edge of the sheet on which the original drawing $a\ b\ c\ \ldots$ exists and also the edge of the sheet to which the drawing is transferred. The points $g'\ i'\ j'\ k'$ of Fig. 18 are laid out similar to the corresponding points of the curve shown in Fig. 18, with the exception that only one scale of the instrument is used during the operation. The process is useful in perspective drawing. In a number of the above-mentioned cases the exact location of the point to be found must be estimated with the eye. If greater accuracy is required, however, then this instrument affords a mechanical means for obtaining the exact location of the point in question in all these incommensurable cases. To illustrate the use of the mechanical means just mentioned, the following is given: the example being transferring the point $g$ in Fig. 18 to to the point $g'$ in Fig. 18. The instrument is first rotated about the point $h$, as before described, until the scale F extends over the point $g$. The needle point B is now passed through the first aperture lying toward $h$ from $g$ to form a puncture, at the same time passing the needle point through the aperture numbered 55 to leave a puncture in the vicinity of $g'$. A perpendicular line is now drawn from the point $g$ to the line $s\ o$, and then the instrument is rotated about the point $h$ until the aperture numbered 50 comes in contact with the perpendicular line just drawn, and with the instrument in this position the needle point B is passed through the aperture numbered 55, and through the puncture formed a perpendicular line is drawn to the line $s\ o$ and the point of intersection of this perpendicular, and the line $h$ 55 or $h\ g$ produced is the proper location of the point $g'$. When producing a record which involves this means of locating a point, two positions of the instrument must be indicated; that is, when the instrument is rotated about the point $h$ until the scale F comes in contact with the point $g$, then the line $s\ o$ coincides with the negative 80°, and when the instrument is rotated about the point $h$ until the aperture 50 comes in contact with the perpendicular drawn from $g$ to $s\ o$, then the line $s\ o$ coincides with the negative 83° and the record for the point $g$ is read $-80°$ and $-83°-50$. This holds true for all incommensurable cases.

The scale D is also valuable in making perspective drawings, and to assist in this kind of work I provide the instrument with the scale L of equal parts. In order to more fully bring out this feature, I proceed as follows, special reference being had to Fig. 20, which represents a pile of cubes upon an area six (6) units long and five (5) units wide; over the right half of this surface the cubes are laid two in height and over the left half they are four cubes in height, and the figure is produced as follows:

The line $x\ x'$ representing the horizontal is first drawn and then the instrument is placed in the position shown in Fig. 20; that is, the starting point D' of the scale D is caused to coincide with the point $x^2$ on the horizontal line $x\ x'$ so that the scale D stands at right angles to the said line $x\ x'$. The needle point B is now passed through the aperture numbered 60 . . . of the scale D, and then a line parallel to $x\ x'$ is drawn through the puncture made say at 60, and this line is considered the base line for the figure, and all distances to the right and left are laid out on this base line, while distances in height are laid out on the perpendicular lines drawn from this base line. It is understood that this base line may be produced from any of the apertures in the scale D with the result of making the object appear at a greater distance, or rather with the result of changing the point of observation of the onlooker relative to the figure. On the base line are laid out the equi-spaced points $a\ b\ c\ d\ e\ f\ g$ by the use of the scale L, and the needle point B passed through the apertures in the said scale. Now from the points $a\ b\ c$ perpendicular lines are constructed which are two units in height according to the scale L, and from the points $d\ e\ f\ g$ perpendicular lines four units in height are drawn, and then the lines $g^4\ d^4$, $g^3\ d^3$, $g^2\ a^2$ and $g'\ a'$ are drawn parallel to the base line $a\ g$. After this has been done the radiating lines $x^2\ a^2, x^2\ a', x^2\ a, x^2\ b^2, x^2\ c^2, x^2\ d^2, x^2\ d^3, x^2\ d^4, x^2\ e^4, x^2\ f^4$ and $x^2\ g^4$ are drawn. The instrument is now placed on the figure in such a manner that the point D' of the scale D coincides with the vanishing point $x^2$, and then the instrument is rotated about this point until some point of the scale D, say 57, comes in contact with the line $a\ a^2$; then the operator passes the needle point through the aperture 57, and through the five preceding apertures so as to leave punctures 57 to 52 as indicated in Fig. 20. Through each of these punctures a line parallel to $a\ a^2$ is drawn which is limited by the lines $x^2\ a$ and $x^2\ a^2$. When this has been done, the instrument is again rotated about the point $x^2$ until some point of the scale D, say 61, comes in contact with the line $a^2\ d^2$, and then the operator passes the needle point through the aperture 61, and through the five preceding apertures, as indicated in Fig. 20; and through each of the punctures made, lines parallel to $a^2\ d^2$ are drawn limited by $x^2\ a^2$ and $x^2\ d^2$. The instrument is now again rotated about the point $x^2$ until some point of the scale D, say 60, comes in contact with the line $d^2\ d^4$, and then the needle point is passed through the aperture 60, and through the five preceding apertures, and then the operator proceeds as before described, so as finally to produce the complete figure of the pile of cubes, as shown in Fig. 20. The line referred to above which is parallel to $a\ a^2$ and passes through point 52, in line $x^2$ (57), divides the line $x^2\ 57$ into two parts, of which parts the part connecting with $x^2$ equals $$x^2 52 = ab^{52} = \frac{ab^{57}}{b^5} = \frac{x^2 57}{b^5}$$

and since it is a geometrical rule that parallel lines divide all lines that radiate from the same point into like proportions, the line which is parallel to $a\ a^2$ and passes through point 52 divides the line $x^2\ a^2$ into two parts of which parts the part connecting with $x^2$ equals $$\frac{x^2 a^2}{b^5}$$

The line referred to above, which is parallel to $a^2\ d^2$ and passes through point 56 in line $x^2$ 61 divides the line $x^2\ 61$ into two parts, of which parts the part connecting with $x^2$ equals $$x^2 56 = ab^{56} = \frac{ab^{61}}{b^5} = \frac{x^2 61}{b^5}$$

and since it is a geometrical rule that parallel lines divide all lines radiating from the same point into like proportions, the line which is parallel to $a^2\ d^2$ and passes through point 56, divides the line $x^2\ a^2$ into two parts, of which parts the part connecting with $$x^2 = \frac{x^2 a^2}{b^5}$$

Therefore the line which is parallel to $a\ a^2$ and passes through point 52, and the line which is parallel to line $a^2\ d^2$ and passes through point 56, cuts the line $x^2\ a^2$ at points which are identical. In like manner it may be proved that every horizontal line which meets $x^2\ a^2$ and its corresponding perpendicular line which meets $x^2\ a^2$ meets the line $x^2\ a^2$ at points which are identical. In like manner it may be proved that corresponding horizontal and perpendicular lines which meet $x^2\ d^2$ meet it at points which are identical, and that the corresponding horizontal and perpendicular lines which meet $x^2\ d^4$ meet it at points which are identical.

The figure just described is given to illustrate the use of the instrument when whole units of the scale L are used, while Fig. 21 illustrates the use of the instrument when fractions of the unit used are involved, said fractions being obtained from the subdivisions L' of the scale L, also fractions of units measured toward or from the vanishing point are obtained from the subdivisions of arcs E and E'. Fig. 21 represents a cross, seven feet in height, made of material one and a half feet square and has the dimensions given in said figure, and is made to appear in perspective as follows: First, a horizontal line $x\ x'$ is drawn, and from the vanishing point $x^2$ a perpendicular line is drawn, and on this perpendicular line the distance 60 is laid out by the use of the scale D, and through this point 60 the base line is drawn parallel to the horizontal line $x\ x'$. Now at any distance on the base line is located the point $s$, and the point $r$ is located one and one-half units to the right on the same line by use of the scale L mentioned, it being understood that the dividing unit portion L' of the said scale is employed to obtain the fractions. From the points $r$ and $s$ perpendicular lines are constructed, seven units in height, to obtain the points $s^7$, $r^7$, which are connected with each other by a straight line. On the line $s\ s^7$ are laid off the points $s^4$ and $s^{5\frac{1}{2}}$ at distances respectively four and five and a half units from the point $s$, and then the radiating lines $x^2\ s^7$, $x^2\ s^{5\frac{1}{2}}$, $x^2\ s^4$, $x^2\ s$ and $x^2\ r$ are drawn. The starting point D' of the scale D is now placed on the point $x^3$ in the horizontal line $x\ x'$, and then the instrument is rotated about that point until the scale D stands at right angles to the said horizontal line, and then the operator passes the needle point through the aperture numbered 59, after which the instrument is rotated counterclockwise about the point $x^3$ until the division 6 of the scale E' coincides with the puncture just made, and with the instrument in this position the needle point is passed through the perforation numbered 59, thus leaving the puncture designated by 1'—6''. The points $x^3$, 59 and 1'—6'', etc., may be laid out near the edge of the sheet so that they may be cut off from the drawing. Through puncture 1'—6'' a line parallel to the horizontal line $x\ x'$ is drawn and at the intersection of this line with the line $x^2\ s$ is erected the perpendicular line $t\ t^7$, which perpendicular line is one and one-half units to the rear of the line $s\ s^7$. The instrument is now swung back until the scale D is perpendicular to the horizontal line $x\ x'$, and then the needle point is passed through the aperture numbered 57, and through the puncture made thus and numbered 57 a line parallel to the horizontal line $x\ x'$ is drawn which cuts the line $x^2\ s$ at $u$. This point $u$ is three units to the rear of $s$ and by projecting from the point $u$ the limit of the left arm of the cross is formed. The instrument is now again rotated about the point $x^3$ until the division 6 of the scale E coincides with the puncture 59, and then the needle point is passed through the aperture numbered 62 of the scale D so as to leave the puncture practically 2'—6'' or one and one-half units closer to the observer than the line $s\ r^{60}$, through which puncture a horizontal line is drawn. At the intersections of the line just made with the lines $x^2\ s$ and $x^2\ r$ extended, perpendicular lines are drawn, and at the intersections of the perpendicular line drawn from the point $v$ with the lines $x^2\ s^4$ extended and $x^2\ s^{5\frac{1}{2}}$ extended, parallel lines are drawn to the right, and limited by the perpendicular line drawn from $w$. These parallel lines with the segments which they cut off from the perpendicular lines drawn from $v$ and $w$ form the boundary of the right arm of the cross.

The description of Fig. 21 illustrates the handling of the instrument when $\frac{1}{12}$ of the unit used are involved. It will be noticed that when the scale D has been rotated about $x^3$ then the aperture 60 of the scale D nears the line $x\ x'$, and when the aperture 60 comes as close to the line $x\ x'$ as the aperture marked 59 when the scale is perpendicular, then the distance $x\ x'$ 59=58 on the scale when perpendicular, and $x\ x'$ 58=57 on the scale when perpendicular. And had $\frac{1}{12}, \frac{2}{12}, \frac{3}{12}$ ... of the unit used been involved, then the first, second, third, and so on, division of the arc E' drawn from 59 would have been used. This arc E' enables a unit close or far from the vanishing point to be divided into halves, thirds, fourths, sixths and twelfths by using respectively $\frac{6}{12}, \frac{4}{12}, \frac{3}{12}, \frac{2}{12}$ and $\frac{1}{12}$. In like manner the arc which extends from the aperture 58 enables each unit of distances from or toward the vanishing point $x^2$ to be divided into halves, fifths and tenths by using respectively $\frac{5}{10}, \frac{2}{10}, \frac{1}{10}$ or using the divisions 5, 2 and 1 of the scale E.

Scale E or arc E is so graduated that lines drawn from its graduation points, perpendicular to scale D, limit distances from D' which equal respectively $ab^{57}$, $ab^{57.1}$, $ab^{57.2}$, $ab^{57.3}$ ... and arc E' is so graduated that lines drawn from its graduation points perpendicular to scale D limit distances from D' which equal respectively $$ab^{58\frac{1}{12}}, ab^{58\frac{2}{12}}, \ldots$$

By the combined use of these two arcs E and E' any unit of distance toward or from the vanishing point $x^2$ may be divided into halves, thirds, fourths, fifths, sixths, tenths and twelfths. All the perpendicular and horizontal distances are measured by the scale of equal parts L, and the measurements are taken in the plane which contains the points $r$, $s$, $s^7$, $r^7$, and all the points in the planes which are closer or farther from the plane mentioned are found by the intersection of lines; and all distances toward the vanishing point are first laid out on the floor or the plane which contains the points $r, s, t, u, v, w$; and the distances at different altitudes are found by projecting up or down from this plane, as the case may require.

In Fig. 23, scale D is laid out at right angles to $x\,x'$, and from the points 55, 56, 57, 58... the lines 55—55', 56—56', 57—57', 58—58'... are drawn parallel to $x\,x'$. Now if scale D is rotated from its position in Fig. 23 about the point D' until point 58 comes in contact with the line 57—57' as it does in position D' $d$ then 56—56' cuts scale D at point 57.

Proof:

Since $D'56 = ab^{56}$, $D'57 = ab^{57}$ ... then $$D'56 = \frac{D'57}{b} \qquad D'57 = \frac{D'58}{b} \ldots,$$

and since 56—56' cuts D' 57 at a point which equals.

$$\frac{D'57}{b}$$

then 56—56' cuts D' 57' at a point which equals $$\frac{D'57'}{b}$$

(a pencil of lines cut by parallels) and since $D'57' = D'58$ (constructed by radii of same circle) 56—56' cuts scale D at a point which equals:

$$\frac{D'57'}{b} = \frac{D'58}{b} = D'57 \quad Q.E.D.$$

It may be further proved that 55—55' cuts D' 57' at a point which equals:

$$\frac{D'57'}{b^2} = \frac{D'58}{b^2} = D'56$$

When scale D is moved from its position D', D to that of D' $d$ the distance from each of its respective graduation points to $x\,x'$ is diminished by the power of $b$.

In Fig. 23 let $D'57\tfrac{5}{10}$ equal $$ab^{57\tfrac{5}{10}}.$$

and the line $57\tfrac{5}{10}$—$57\tfrac{5}{10}'$ be drawn parallel to $x\,x'$. Now if scale D is rotated from its position D' D about D' until point 58 comes in contact with $57\tfrac{5}{10}$—$57\tfrac{5}{10}'$ as it does in position D' $d'$, the distance from point 58 to $x\,x'$ has been diminished by five tenths the power of $b$. And by a proof similar to the above it may be proved that while scale D is moved from D' D to that of D' $d'$ the distance from each respective graduation point of scale D to $x\,x'$ is diminished by five tenths the power of $b$. By using graduation numbered five of arc E, distances which equal $ab^{77.5}$, $ab^{76.5}$, $ab^{75.5}$ ... may be measured in the manner described. By using the first, second, third, ... graduation of arc E distances involving one-tenth, two-tenths, three-tenths ... of the power of $b$ may be measured. By using the first, second, third ... graduation of arc E' distances involving one-twelfth, two-twelfths, three-twelfths ... of the power of $b$ may be measured.

The length in degrees and minutes of the arc E shown in Fig. 22 is found by mathematics, involving a table of logarithmic sines and co-sines, to be 21° 05'. The length of the arc between scale D and each respective division of 1, 2, 3, 4, 5, 6, 7, 8 and 9 of arc E is found in like manner to be respectively 20° 01', 18° 54', 17° 42', 16° 25', 15° 00', 13° 26', 11° 39', 9° 31', and 6° 46'. The length in degrees and minutes of arc E' is found to be 21° 05'. The length of the arc between scale D and each respective division 1, 2, 3, 4, 5, 6, 7, 8, 9, 10 and 11 arc E' is found to be respectively 20° 13', 19° 17', 18° 19', 17° 17', 16° 11', 15° 00', 13° 42', 12° 16', 10° 38', 8° 42', and 6° 09'.

To illustrate the use of the arcs E or E' with respect to the handling of line segments, I give Fig. 24, in which line ($a$) of Fig. 6 is desired to be enlarged to the length of $a'''$, Fig. 24, and the lines $b$ and $c$ of Fig. 6 to be enlarged in the same proportion. But by placing the scale D on the line $a'''$ of Fig. 24 it is found to equal more than 61 but less than 62 of that scale. Now a perpendicular T T' is drawn from the right extremity of $a'''$. Now, D' of the scale D is placed at the other extremity of $a'''$ and the instrument is rotated about that point until 62 of the scale D cuts the perpendicular T T'. Then the indication of the scale E over the line $a'''$ is noted and found to be seven, and thus the line $a'''$ is found to index $61\tfrac{7}{10}$ or $21\tfrac{7}{10}$ greater than ($a$) of Fig. 6. The line $b'''$ is laid out as follows: Place point D' at the left extremity of the line $b'''$ and rotate the instrument about that point until division seven of the arc E coincides with the line $b'''$, and pass the needle point through the perforation 66 of the scale D forming the puncture $t'$, and from this puncture draw the perpendicular $t'\,t$ which cuts $b'''$ off at the proper length $65\tfrac{7}{10}$. Now suppose that line $c$ of Fig. 6 equaled $49\tfrac{3}{10}$ then line $c'''$ of Fig. 24 would equal $49\tfrac{3}{10} + 21\tfrac{7}{10}$ or 71 and being even or free from fractions may be laid out without the use of either arc E or E'.

In the various applications of the instrument shown it was not deemed necessary to show the plate A with all its markings, but only with those needed to illustrate the points in question. It is understood, however, that the use of the instrument is not limited to the examples shown and described.

I claim—

1. A drawing instrument having a linear scale and numerals thereon, the division of the said scale equaling the algebraic expression $ab^n$, and the said numerals equaling the exponent "n" of said algebraic expression, $a$ of said algebraic expression having the value of .78125 millimeter and $b$ having the value of $$\frac{10}{\sqrt{2}},$$

the said exponent "n" being variable, free from fractions, of the value of 1, 2, 3, 4 . . . respectively, for each successive division, as set forth.

2. A drawing instrument having two apertured linear scales with numerals thereon, one of which linear scales is of equal parts and one of which linear scales has divisions which equal the algebraic expression $ab^n$, the numerals of which latter scale equal the exponent "n," of which algebraic expression $a$ equals .78125 millimeter, $b$ equals $$\frac{10}{\sqrt{2}}$$

and "n" is a variable of the value of 1, 2, 3, 4 . . ., respectively, for each successive division, as set forth.

3. A drawing instrument consisting of a transparent plate provided with an apertured linear scale having a primary and a secondary set of divisions, each of the primary divisions of said scale being successively limited by the points D' and 38, D' and 39, D' and 40 . . ., each of the primary divisions of said scale being respectively represented by the numerals 38, 39, 40 . . ., each of the primary divisions of said scale being respectively equal to the algebraic expression $ab^{38}$, $ab^{39}$, $ab^{40}$ . . ., in which algebraic expression $a$ has the value of .78125 millimeter and $b$ has the value of $$\frac{10}{\sqrt{2}},$$

each of the secondary divisions of said scale being successively limited by the points 39 and 40, 40 and 41, 41 and 42 . . ., each of the secondary divisions of said scale being respectively represented by the inverted numerals.

1, 2, 3, 4, . . ., each of the secondary divisions of said scale being respectively equal to the algebraic expression $ab$, $ab^2$, $ab^3$, $ab^4$ . . ., in which algebraic expression $a$ has the value of .78125 millimeter, and $b$ has the value of $$\frac{10}{\sqrt{2}},$$

as set forth.

4. A drawing instrument having an apertured linear scale provided with numerals, the divisions of said scale equaling the algebraic expression $ab^n$ and the said numerals equaling the exponent "n" of said algebraic expression, $a$ of said algebraic expression having the value of .78125 millimeter, $b$ having the value of the $$\frac{10}{\sqrt{2}},$$

and "n" being a variable of the value 1, 2, 3, 4 . . . respectively, for each successive division, and also having graduated vernier arcs extending from said scale, the common center of the arcs being in the beginning point of said scale, as set forth.

5. A drawing instrument having an apertured linear scale of unequal divisions, said scale being so divided that each successive division is the mean proportional between its preceding and its succeeding division, the larger divisions of said scale being limited by their respective scale points and the beginning point of said scale, the smaller divisions of said scale being limited by two succeeding points of said scale, as set forth.

6. A drawing instrument, having an apertured linear scale of unequal divisions, said scale being so divided that each successive division is the mean proportional between its preceding and its succeeding division, the larger divisions of said scale being limited by their respective scale points and the beginning point of said scale, said larger divisions being designated by numerals written right side up near their respective scale points, the smaller divisions of said scale being limited by two succeeding points of said scale, said smaller divisions being designated by numerals written upside down near the center of each respective small division, as set forth.

7. A drawing instrument having an apertured linear scale provided with numerals, the divisions of said scale equaling the algebraic expression $ab^n$, and the said numerals equaling the exponent "n" of said algebraic expression, $a$ of said algebraic expression having the value of .78125 millimeters, $b$ having the value of the $$\frac{10}{\sqrt{2}},$$

having the value of .78125 millimeter, $b$ 3, 4 . . . respectively for each successive division, and also having concentric graduated vernier arcs extending from said linear scale, the centers of the arcs being in the beginning point of said scale and the arcs extending from points 58 and 59 of said scale, as set forth.

8. A drawing instrument having an apertured linear scale provided with numerals, the divisions of said scale equaling the algebraic expression $ab^n$, and the said numerals equaling the exponent "n" of said algebraic expressions, $a$ of said algebraic expression having the value of .78125 millimeter, $b$ having the value of the $$\frac{10}{\sqrt{2}},$$

and "n" being a variable of the value 1, 2, 3, 4 . . ., respectively, for each successive division, and also having graduated vernier arcs extending from said scale, the common center of the arcs being in the beginning point of said scale and the arcs having different subdivisions, as set forth.

9. A drawing instrument having an apertured linear scale provided with numerals, the divisions of said scale equaling the algebraic expression $ab^n$, and said numerals equaling the exponent "n" of said algebraic expression, $a$ of said algebraic expression having the value of .78125 millimeter, $b$ having the value of the $$\frac{10}{\sqrt{2}},$$

and "n" being a variable of the value of 1, 2, 3, 4 . . ., respectively, for each successive division, and also having a graduated vernier arc extending from point 59 of said linear scale, the center of the arc being at the beginning point of said scale, and the arc being divided into twelve unequal parts, as set forth.

10. A drawing instrument having an apertured linear scale provided with numerals, the divisions of said scale equaling the algebraic expression $ab^n$, and the said numerals equaling the exponent "n" of the said algebraic expression, $a$ of the said algebraic expression having the value of .78125 millimeter, $b$ having the value of the $$\frac{10}{\sqrt{2}},$$

and "n" being a variable of the value 1, 2, 3, 4 . . ., respectively for each successive division, and also having a graduated vernier arc extending from point 58 of said linear scale, the center of the arc being at the beginning point of said scale and the arc being divided into ten unequal parts, as set forth.

11. A drawing instrument having an apertured linear scale provided with numerals, the divisions of said scale equaling the algebraic expression $ab^n$, and the said numerals equaling the exponent "n" of said algebraic expression, $a$ of the said algebraic expression having the value of .78125 millimeter, $b$ having the value of the $$\frac{10}{\sqrt{2}},$$

and "n" being a variable of the value 1, 2, 3, 4 . . ., respectively, for each successive division, and also having concentric graduated vernier arcs extending from the linear scale, the centers of the arcs being in the beginning point of the scale, and the arcs extending from points 58 and 59 of the scale, the arc extending from point 58 being divided into ten unequal parts and the arc extending from point 59 being divided into twelve unequal parts, as set forth.

12. A drawing instrument consisting of a transparent plate provided with an apertured linear scale having numerals thereon, the divisions of said scale equaling the algebraic expression $ab^n$, and the said numerals equaling the exponent "n" of said algebraic expression, of which algebraic expression $a$ has the value of .78125 millimeter, $b$ has the value of the $$\frac{10}{\sqrt{2}},$$

and "n" being a variable of the value 1, 2, 3, 4 . . ., respectively for each successive division, and also provided with concentric graduated vernier arcs extending from said linear scale, the centers of the arcs being in the beginning point of said scale and the arcs extending from points 58 and 59 of said scale, the arc extending from the point 58 being divided into ten unequal parts, and the arc extending from point 59 being divided into twelve unequal parts, and said drawing instrument being also provided with an apertured linear scale of equal parts, one of which parts is subdivided into divisions, as set forth.

13. A drawing instrument having two apertured linear scales of unequal divisions extending in opposite directions from a common center, each scale being so divided that each successive division is the mean proportional between its preceding and its succeeding division, the divisions of said scale being limited by the respective scale points and the beginning point of said scales, as set forth.

14. A drawing instrument having an apertured linear scale of unequal divisions, said scale being so divided that each successive division is the mean proportional between its preceding and its succeeding division, the divisions of said scale being limited by the respective scale points and the beginning point of said scale and having arcs extending from the beginning point of said scale, and also having radial lines thereof extending from sundry of the graduation points of said scale, as set forth.

15. A drawing instrument having an apertured linear scale of unequal divisions, said scale being so divided that each successive division is the mean proportional between its preceding and its succeeding division, the divisions of said scale being limited by the respective scale points and the beginning point of said scale, and having arcs extending from the beginnig point of said scale, and also having radial lines thereof extending from sundry of the points of said scale, each arc starting at the beginning point of said scale to intersect its radial line, as set forth.

16. A drawing instrument having an apertured linear scale of unequal division parts, said scale being so divided that each successive division is the mean proportional between its preceding and its succeeding division, the divisions of said scale being limited by the respective scale points and the beginning point of said scale and having arcs extending from the beginning point of said scale and also having radial lines extending from sundry points of said scale, said several radial lines having a common meeting point when produced, as set forth.

17. A drawing instrument consisting of a plate having two apertured linear scales of unequal divisions extending lengthwise on the plate in opposite directions from a common point, each scale being so divided that each successive division is the mean proportional between its preceding and its succeeding division, the divisions of said scales being limited by the respective scale points and the beginning point of said scales, and having arcs having radial lines extending from sundry of the points of said scales, as set forth.

18. A drawing instrument consisting of a transparent plate having two apertured linear scales of unequal divisions extending lengthwise on the plate in opposite directions from a common point, each scale being so divided that each successive division is the mean proportional between its preceding and its succeeding division, the divisions of said scales being limited by the respective scale points and the beginning point of said scales, and also having arcs having their radial lines extending from sundry of the points of said scales, each arc starting at the said common point to intersect its radial line, as set forth.

19. A drawing instrument consisting of a transparent plate having two apertured linear scales of unequal divisions extending lengthwise on the plate in opposite directions from a common point, each scale being so divided that each successive division is the mean proportional between its preceding and its succeeding division, the divisions of said scales being limited by the respective scale points and the beginning point of said scales, and also having arcs having their radial lines extending from sundry of the points of said scales, each arc starting at the said common point to intersect its radial line, and the several radial lines of both scales having a common meeting point when produced, as set forth.

20. A drawing instrument having an apertured linear scale of unequal divisions, said scale being so divided that each successive division is the mean proportional between its preceding and its succeeding division, the divisions of said scale being limited by the respective scale points and the beginning point of said scale, as set forth.

21. A drawing instrument consisting of a transparent plate having two apertured linear scales of unequal divisions extending lengthwise on the plate in opposite directions from a common point, the divisions of said scales equaling the algebraic expression $ab^n$, in which algebraic expression $a$ has the value of .78125 millimeter, $b$ has the value of the $$\frac{10}{\sqrt{2}},$$

and "$n$" has the value of 1, 2, 3, 4 . . . for each respective division, said plate having hexagonal figures, each hexagon having a side co-extensive with the side of the adjacent hexagon, as set forth.

22. A drawing instrument consisting of a transparent plate having an apertured linear scale of unequal divisions, said scale being so divided that each successive division is the mean proportional between its preceding and its succeeding division, the divisions of said scale being limited by the respective scale points and the beginning point of said scale, said plate having hexagonal figures, each hexagon having a side co-extensive with the side of the adjacent hexagon, as set forth.

23. A drawing instrument consisting of a transparent plate, provided on its face with a protractor and two apertured linear scales of unequal divisions extending lengthwise on the plate in opposite directions from the center of the protractor and along the base thereof, each scale being so divided that each successive division is the mean proportional between its preceding and its succeeding division, the divisions of said scales being limited by the respective scale points and the beginning point of said scales, and also provided with arcs extending from the center of said protractor, and their radial lines extending from sundry of the points of the scales, as set forth.

24. A drawing instrument consisting of a transparent plate provided on its face with a protractor and two apertured linear scales extending lengthwise of the plate in opposite directions from the center of the protractor and along the base thereof, each scale being so graduated that the space between the beginning point of the scale and each of its several graduation points equals respectively the algebraic expression $ab$, $ab^2$, $ab^3$, $ab^4$, etc., in which algebraic expression $b$ has the value of the $$\frac{10}{\sqrt{2}},$$

and $a$ has the value of .78125 millimeter, and also provided with arcs extending from the center of said protractor and their radial lines extending from sundry of the points of said scales, and each arc starting at the center of said protractor to intersect its radial line, as set forth.

25. A drawing instrument consisting of a transparent plate provided on its face with a protractor and two apertured linear scales extending lengthwise of the plate in opposite directions from the center of the protractor and along the base thereof, each scale being so graduated that the space between the beginning point of the scale and each of its several graduation points equals respectively the algebraic expression $ab$, $ab^2$, $ab^3$, $ab^4$, etc., in which algebraic expression $b$ has the value of the $$\frac{10}{\sqrt{2}}$$

and $a$ has the value of .78125 millimeter, and also provided with arcs extending from the center of said protractor and their radial lines extending from sundry of the points of the scales, and each arc starting at the center of said protractor to intersect its radial line, and the said several radial lines having a common meeting point when produced, as set forth.

26. A drawing instrument consisting of a plate, provided with an apertured linear scale so graduated that the space between the beginning point of said scale and each of its several graduation points equals respectively the algebraic expression $ab$, $ab^2$, $ab^3$, $ab^4$, etc., in which algebraic expression $b$ has the value of the $$\frac{10}{\sqrt{2}},$$

and $a$ has the value of .78125 millimeter, and also provided with a linear scale having equal divisions, as set forth.

27. A drawing instrument consisting of a plate provided with a linear scale so divided that the length of each successive division equals respectively the algebraic expression $ab$, $ab^2$, $ab^3$, $ab^4$ . . ., in which algebraic expression $b$ has the value of the $$\frac{10}{\sqrt{2}}$$

and $a$ has the value of .78125 millimeter, and also provided with a linear scale having equal divisions, as set forth.

28. A drawing instrument consisting of a plate provided with a scale of unequal divisions, said scale being so divided that each successive division is the mean proportional between its preceding and its succeeding division, the divisions of said scale being limited by the respective scale points and the beginning point of said scale, and also provided with a linear scale having equal divisions, said plate being apertured at the division points of said scales, as set forth.

29. A drawing instrument having an apertured linear scale provided with numerals, the divisions of said scale equaling the algebraic expression $ab^n$ and said numerals equaling the exponent "n" of said algebraic expression, $a$ having the value of .78125 millimeter, $b$ having the value of the $$\frac{10}{\sqrt{2}}$$

and "n" being a variable having the values 1, 2, 3, 4 . . ., respectively for each successive division, and also having a vernier arc extending from point 58 of said scale, the center of the arc being the beginning point of said scale, said arc being divided into ten parts by graduation points, the length of the respective parts of the arc being such that lines drawn from their respective graduation points perpendicular to said scale, cut said scale at points which limit distances from the beginning point of said scale, which distances equal respectively the algebraic expression $$ab^{57}, ab^{57.1}, ab^{57.2}, ab^{57.3}, \ldots$$

for each respective arc graduation, in which algebraic expression $a$ has the value of .78125 millimeter and $b$ has the value of the $$\frac{10}{\sqrt{2}},$$

as set forth.

30. A drawing instrument consisting of a transparent plate having an apertured linear scale provided with numerals, the divisions of said scale equaling the algebraic expression $ab^n$, and the said numerals equaling the exponent "n" of said algebraic expression, $a$ of said algebraic expression having the value of .78125 millimeter, $b$ having the value of the $$\frac{10}{\sqrt{2}},$$

and "n" being a variable of the values of 1, 2, 3, 4 . . ., respectively, for each successive division, and also having a vernier arc extending from point 59 of said scale, the center of said arc being the beginning point of said scale, said arc being divided into twelve parts by graduation points, the length of the respective parts of the arc being such that lines drawn from their respective graduation points perpendicular to said scale, cut said scale at points which limit distances from the beginning point of said scale, which distances equal, respectively, the algebraic expression $$ab^{58}, ab^{58\frac{1}{12}}, ab^{58\frac{2}{12}}, ab^{58\frac{3}{12}}, \ldots$$

for each respective arc graduation, in which algebraic expression $a$ has the value of .78125 millimeter, and $b$ has the value of the $$\frac{10}{\sqrt{2}},$$

as set forth.

31. A drawing instrument provided with a series of arcs drawn tangent to each other and having apertured centers, the relative position and magnitude of the several arcs being such that their apertured centers form the graduation points of an apertured linear scale of unequal divisions, said scale being so divided that each successive division is the mean proportional between its preceding and its succeeding division, the divisions of said scale being limited by the respective scale points and the beginning point of said scale, as set forth.

32. A drawing instrument provided with a scale of unequal divisions, said scale being so divided that each successive division is the mean proportional between its preceding and its succeeding division, the divisions of said scale being limited by the respective scale points and the beginning point of said scale, and also provided with arcs extending from the beginning point of said scale each drawn from its individual division point of said scale as a center, and lines radiating from a common center and extending from each arc to its individual division point, as set forth.

33. A drawing instrument consisting of a transparent plate provided on its face with a series of arcs drawn tangent to each other and having apertured centers, the relative position and magnitude of the several arcs being such that their apertured centers form the apertured graduation points of a scale of unequal divisions, said scale being so divided that each successive division is the mean proportional between its preceding and its succeeding division, the divisions of said scale being limited by the respective scale points and the beginning point of said scale, as set forth.

34. A drawing instrument consisting of a transparent plate provided on its face with a series of arcs drawn tangent to each other and having apertured centers, the relative position and magnitude of the several arcs being such that their apertured centers form the apertured graduation points of two linear scales of unequal divisions extending in opposite directions in the same line, said scales being so divided that each successive division is the mean proportional between its preceding and its succeeding division, the divisions of said scales being limited by the respective scale points and the beginning point of said scales, as set forth.

35. A drawing instrument consisting of a plate provided in its base with a center from which extend in opposite directions and along the base thereof two apertured linear scales of unequal divisions, each scale being so divided that each successive division is the means proportional between its preceding and its succeeding division, the divisions of said scale being limited by the respective scale points and the beginning point of said scales, and provided with a protractor having its base and its center coinciding with the base and center of said plate, and also provided with lines radiating from said center to several of the graduation points of said protractor, as set forth.

36. A drawing instrument consisting of a transparent plate provided in its base with a center from which extend in opposite directions and along the base two apertured linear scales of unequal divisions, each scale being so divided that each successive division is the mean proportional between its preceding and its succeeding division, the divisions of said scales being limited by the respective scale points and the beginning point of said scales, and provided with a protractor having its base and its center coinciding with the base and center of said plate, and also provided with lines radiating from said center to several of the graduation points of said protractor, and also provided with arcs extending from said center and having their centers in sundry of the apertures, as set forth.

37. A drawing instrument consisting of a transparent plate having a positive scale of unequal divisions and a negative scale of unequal divisions, which scales have a common starting point, each of said scales being so divided that each successive division is the mean proportional between its preceding and its succeeding division, the divisions of said scales being limited by the respective scale points and the common starting point of said scales, and said scales extending in opposite directions from said common starting point, and having arcs extending from the said starting point, and also having lines radiating from a common center to sundry of the graduation points of said scales, the said common center lying in a line erected perpendicular to said scales from the said starting point of said scales, as set forth.

38. A drawing instrument consisting of a transparent plate having a positive scale of unequal divisions and a negative scale of unequal divisions, each of said scales being so divided that each successive division is the mean proportional between its preceding and its succeeding division, the divisions of said scales being limited by the respective scale points and the beginning point of said scales, and said scales extending in opposite directions from a common starting point, and having arcs extending from said starting point, and also having lines radiating from a common center to sundry of the division points of said scales, the said common center lying in a line erected perpendicular to said scales from the said common starting point of said scales, the said radial lines intersecting the said arcs and said transparent plate being provided with a protractor having its center coinciding with the said starting point and having its zero line coinciding with said line erected perpendicular to said scales from said common starting point, as set forth.

39. A drawing instrument consisting of a transparent plate provided on its face with a protractor having a zero line and with a series of arcs of various magnitudes drawn tangent to each other and tangent to said zero line, which protractor is laid out in both directions on said transparent plate with one-half degree units, said protractor having its center coinciding with the common point of tangency of the several arcs, and said protractor having lines radiating from its center to points in its periphery indicated by 0, 15, 30, 45, 60, 75 and 90, as set forth.

40. A drawing instrument consisting of a transparent plate provided on its face with a protractor, having a zero line, and with a series of arcs of various magnitudes drawn tangent to each other and tangent to said zero line, the center of each arc being marked by an aperture which is connected by a line to its respective arc, the relative position and magnitude of the several arcs being such that their apertured centers form the graduation points of two apertured linear scales of unequal divisions, said scales being so divided that each successive division is the mean proportional between its preceding and its succeeding division, the divisions of said scales being limited by the respective scale points and the center of said protractor, which protractor is laid out in both directions from said zero line, on said transparent plate with one-half degree units, said protractor having its center coinciding with the common point of tangency of the several arcs, said transparent plate being also provided with a system of hexagons, each hexagon having a side coextensive with a side of the adjacent hexagon, as set forth.

41. A drawing instrument consisting of a transparent plate having an apertured linear scale of unequal divisions, said scale being so divided that each successive division is the mean proportional between its preceding and its succeeding division, the divisions of said scale being limited by the respective scale points and the beginning point of said scale, said transparent plate being also provided with a system of hexagons, each hexagon having a side co-extensive with a side of the adjacent hexagon, as set forth.

42. A drawing instrument having a linear scale of unequal divisions and having apertures at the division points, said apertures being spaced on said scale so that the distances from any aperture to the beginning point of said scale is the mean proportional between the distance from its preceding aperture to the beginning point of said scale and the distance of its succeeding aperture to the beginning point of said scale, said scale being provided with a set of primary numerals and a set of secondary numerals, each of the primary numerals being situated at an aperture of said scale, which aperture and the beginning point of said scale limit the divisions which that respective numeral designates, each of the secondary numerals being situated near the center of the division which it designates, which division is limited by two successive apertures of said scale, said scale having several of the apertures omitted in its most finely divided portion, as set forth.

In testimony whereof I have signed my name to this specification in the presence of two subscribing witnesses.

JOHN WILLIAM WHALEN.

Witnesses:
L. B. SLYDER,
W. P. CAVANAUGH.